United States Patent
Kano et al.

(10) Patent No.: US 10,272,528 B2
(45) Date of Patent: Apr. 30, 2019

(54) FLUX FOR SUBMERGED ARC WELDING

(71) Applicant: Kobe Steel, Ltd., Kobe-shi (JP)

(72) Inventors: Satoru Kano, Fujisawa (JP); Makoto Ota, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 286 days.

(21) Appl. No.: 14/909,905

(22) PCT Filed: May 27, 2014

(86) PCT No.: PCT/JP2014/064012
§ 371 (c)(1),
(2) Date: Feb. 3, 2016

(87) PCT Pub. No.: WO2015/019684
PCT Pub. Date: Feb. 12, 2015

(65) Prior Publication Data
US 2016/0175993 A1    Jun. 23, 2016

(30) Foreign Application Priority Data

Aug. 5, 2013 (JP) ................... 2013-162116

(51) Int. Cl.
*B23K 35/362* (2006.01)
*B23K 35/36* (2006.01)
(Continued)

(52) U.S. Cl.
CPC ............ *B23K 35/362* (2013.01); *B23K 9/186* (2013.01); *B23K 35/0244* (2013.01);
(Continued)

(58) Field of Classification Search
CPC .. B23K 35/30; B23K 35/362; B23K 35/3602; B23K 35/3605; B23K 35/3607;
(Continued)

(56) References Cited

U.S. PATENT DOCUMENTS 4,361,449 A    11/1982 More
4,566,916 A *   1/1986 Nagano ............... B23K 35/361
                                                    148/26
(Continued)

FOREIGN PATENT DOCUMENTS

AU    2006225236 A1    5/2007
JP    49-70839    7/1974
(Continued)

OTHER PUBLICATIONS

International Preliminary Report on Patentability and Written Opinion dated Feb. 18, 2016 in PCT/JP2014/064012 (with English language translation).

(Continued)

*Primary Examiner* — Thien S Tran
*Assistant Examiner* — John J Norton
(74) *Attorney, Agent, or Firm* — Oblon, McClelland, Maier & Neustadt, L.L.P.

(57) ABSTRACT

Provided is a flux for submerged arc welding that has good welding workability and can reduce the diffusion hydrogen content in a weld metal using either an AC or a DC welding power source. The flux includes $Al_2O_3$: 15 to 35% by mass; $SiO_2$: 10 to 30% by mass; MgO: 10 to 25% by mass; F expressed in terms of $CaF_2$: 10 to 25% by mass; Mn expressed in terms of MnO: 3 to 20% by mass; Na expressed in terms of $Na_2O$ and/or K expressed in terms of $K_2O$: 0.5 to 4.5% by mass in total; Fe expressed in terms of FeO: 0.5 to 8% by mass; and CaO: 6% by mass or less. A water-soluble $SiO_2$ in the flux is less than 1% by mass. In addition, the flux has a composition that satisfies the following formula: $0.2 \leq [Mg/O]/([Al_2O_3]+[MnO]) \leq 0.8$.

7 Claims, 1 Drawing Sheet

(51) Int. Cl.
   *B23K 9/18*   (2006.01)
   *B23K 35/30*  (2006.01)
   *B23K 35/02*  (2006.01)

(52) U.S. Cl.
   CPC .......... *B23K 35/0255* (2013.01); *B23K 35/30* (2013.01); *B23K 35/361* (2013.01); *B23K 35/3602* (2013.01); *B23K 35/3605* (2013.01); *B23K 35/3607* (2013.01); *B23K 35/3608* (2013.01)

(58) Field of Classification Search
   CPC .............. B23K 35/3608; B23K 35/361; B23K 35/0255; B23K 35/0244; B23K 9/186
   USPC .............................................. 219/73; 148/26
   See application file for complete search history.

(56) References Cited

U.S. PATENT DOCUMENTS

2005/0257853 A1* 11/2005 Yamashita ......... B23K 35/0255
                                                                148/26
2007/0051702 A1    3/2007  James et al.
2014/0339201 A1   11/2014  James et al.

FOREIGN PATENT DOCUMENTS

| | | |
|---|---|---|
| JP | 51-87444 | 7/1976 |
| JP | 53-95144 | 8/1978 |
| JP | 62-68695 A | 3/1987 |
| JP | 62-240195 A | 10/1987 |
| JP | 62240195 A * | 10/1987 |
| JP | 63-76793 A | 4/1988 |
| JP | 2-280996 A | 11/1990 |
| JP | 2-290692 A | 11/1990 |
| JP | 9-99392 A | 4/1997 |
| JP | 9-155588 A | 6/1997 |
| KR | 10-2003-0056367 A | 7/2003 |

OTHER PUBLICATIONS

Extended European Search Report dated Apr. 10, 2017 in Patent Application No. 14834620.8.
International Search Report dated Aug. 5, 2014 in PCT/JP14/064012 Filed May 27, 2014.

* cited by examiner

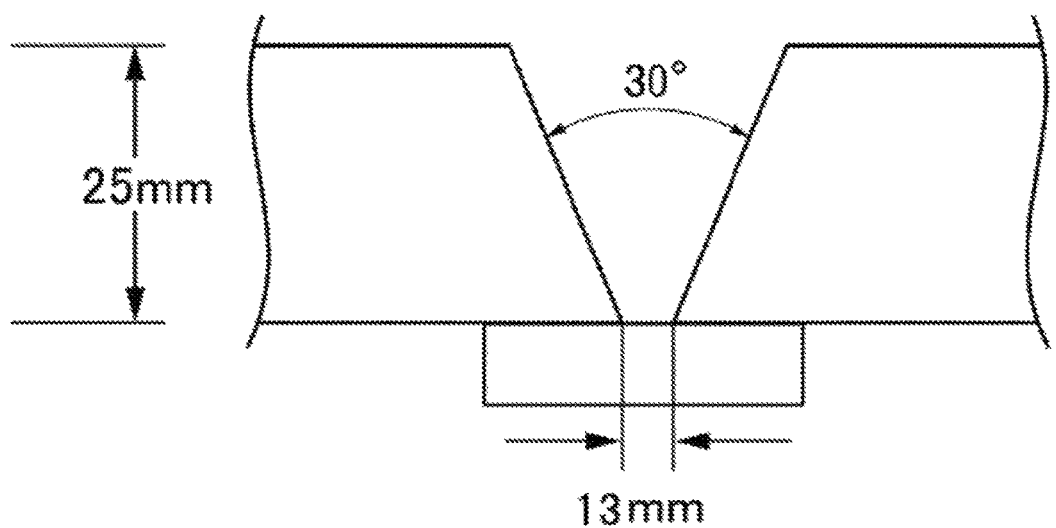

FLUX FOR SUBMERGED ARC WELDING

TECHNICAL FIELD

The present invention relates to a flux for use in submerged arc welding. More specifically, the present invention relates to a high-temperature sintered flux.

BACKGROUND ART

Fluxes for use in submerged arc welding are mainly classified into a fused flux and a sintered flux in terms of the form of flux. The fused flux is manufactured by melting various materials in an electric furnace and the like and crushing them. Whereas, the sintered flux is manufactured by bonding various raw materials with a binder, such as alkaline silicate, granulating them, and sintering the granules.

In general, the sintered fluxes are further classified, depending on the sintering temperature, into a low-temperature sintered flux produced by sintering at 400 to 600° C. and a high-temperature sintered flux produced by sintering at 600 to 1,200° C. The low-temperature sintered flux has been conventionally studied from various aspects to reduce the diffusion of hydrogen into a weld metal (see Patent Documents 1 to 3). For example, Patent Documents 1 to 3 disclose a technique in which the ratio of carbonates to the flux is set in a specific range, thereby generating $CO_2$ gas during welding, thus reducing a partial pressure of $H_2$ gas.

To improve moisture absorption properties without using carbonates, another means is proposed to reduce a hydrogen content in the weld metal by specifying an A value, which is a characteristic value mainly derived from a flux component, as well as the maximum value of a specific surface area of the flux (see Patent Document 4). Whereas, in the high-temperature sintered flux, a technique is proposed to decrease the content of diffused hydrogen by specifying the kind of material, such as a basic oxide, an alkali metal fluoride and an acid oxide, as well as a content thereof (see Patent Document 5).

PRIOR ART DOCUMENT

Patent Document

Patent Document 1: JP 49-70839 A
Patent Document 2: JP 53-95144 A
Patent Document 3: JP 51-87444 A
Patent Document 4: JP 9-99392 A
Patent Document 5: JP 62-68695 A

DISCLOSURE OF THE INVENTION

Problems to be Solved by the Invention

However, the above-mentioned technique for reducing the diffusion hydrogen content in the sintered flux has the following problems. First, in the low-temperature sintered flux with the carbonates added, as mentioned in Patent Documents 1 to 3, the use of a DC welding power source increases the consumed amount of the flux, promotes the decomposition of the carbonates, compared to the use of an AC welding power source, and coarsens the surfaces of beads because of large amounts of CO gas and $CO_2$ gas generated during the welding. Further, such a flux has the problem that pockmarks are generated, thereby degrading the outer appearance and shape of beads.

The technique disclosed in Patent Document 4 handles MnO as a hydrate component, regarding the A value which is an index of the hydration properties. However, MnO can become non-hydrated component, in combination with other flux components. In the technique disclosed in Patent Document 4, the specific surface area of the flux is reduced. However, the specific surface area of the flux drastically affects the shield properties of a slag during welding. Specifically, when the specific surface area of the flux is reduced, the shield properties of the slag might be degraded, thus increasing a nitrogen content in the weld metal, reducing the toughness of the weld metal.

Whereas, in the technique disclosed in Patent Document 5 regarding the high-temperature sintered flux, flux components are designed mainly to be compatible with the AC welding power source. However, this technique does not take into consideration the degradation in welding workability that would be most afraid of in the use of the DC welding power source. That is, in the flux disclosed in Patent Document 5, the use of the DC welding power source does not gain the substantially same effects as that in use of the AC welding power source.

Accordingly, it is a main object of the present invention to provide a flux for submerged arc welding that has good welding workability and can reduce the diffusion hydrogen content in a weld metal in the use of either the AC or DC welding power source.

Means for Solving the Problems

A flux for submerged arc welding according to the present invention includes: $Al_2O_3$: 15 to 35% by mass; $SiO_2$: 10 to 30% by mass; MgO: 10 to 25% by mass; F (in terms of $CaF_2$): 10 to 25% by mass; Mn (in terms of MnO): 3 to 20% by mass; Na (in terms of $Na_2O$) and/or K (in terms of $K_2O$): 0.5 to 4.5% by mass in total; and Fe (in terms of FeO): 0.5 to 8% by mass, in which a CaO content is restricted to 6% by mass or less, a water-soluble $SiO_2$ is restricted to less than 1% by mass, and the flux satisfies the following formula 1:

$$0.2 \leq [MgO]/([Al_2O_3]+[MnO]) \leq 0.8 \qquad \text{[Formula 1]}$$

where $[Al_2O_3]$ is an $Al_2O_3$ content, [MgO] is an MgO content, and [MnO] is an Mn content (in terms of MnO).

The flux for submerged arc welding further includes: $TiO_2$: 8% by mass or less, in which the flux can have the composition that satisfies the following formula 2:

$$0.2 \leq [MgO]/([Al_2O_3]+[MnO]+[TiO_2]) \leq 0.8 \qquad \text{[Formula 2]}$$

where $[TiO_2]$ is a $TiO_2$ content.

In the flux for submerge arc welding in the present invention, a C content may be restricted to 0.2% by mass or less.

The flux for submerge arc welding in the present invention is sintered, for example, at a temperature of 800° C. or higher.

Effects of the Invention

According to the present invention, since the contents of respective components are specified, and the ratio of the Mg content to the total contents of Al and Mn is set in a specific range, the flux for submerged arc welding can have good welding workability and reduce the diffusion hydrogen content in the weld metal in the use of either the AC or DC welding power source.

BRIEF DESCRIPTION OF THE DRAWINGS

FIG. 1 is a diagram showing the shape of a groove in a test specimen used at a welding test in Examples.

MODE FOR CARRYING OUT THE INVENTION

Embodiments for carrying out the present invention will be described in detail below. The present invention is not limited to the embodiments mentioned below.

The inventors have diligently studied by experiments to solve the above-mentioned problems and found out the following. When using the DC welding power source, to keep the slag removability adequate, the content of $SiO_2$ in the flux should be reduced as much as possible. Regarding MgO, unless the amount of added MgO is set more than that in the flux mentioned in Patent Document 5, the slag removability cannot be improved.

A flux for submerged arc welding according to the embodiment of the present invention (hereinafter simply referred to as a "flux") is restricted such that a $SiO_2$ content is in a range of 10 to 30% by mass, an MgO content is in a range of 10 to 25% by mass, and a hydrate $SiO_2$ content is less than 1% by mass. In the flux of the present embodiment, each components are adjusted to satisfy the formula 3 below:

$$0.2 \leq [MgO]/([Al_2O_3]+[MnO]) \leq 0.8 \quad \text{[Formula 3]}$$

where $[Al_2O_3]$ is an $Al_2O_3$ content, $[MgO]$ is an MgO content, and $[MnO]$ is an Mn content (in terms of MnO).

The reason for restricting the composition of the flux in the present embodiment will be described below. The content of each component in the flux of the present embodiment is a value obtained by converted a value quantified by a method defined by JIS Z 3352, in terms of oxide or fluoride, unless otherwise specified.

[$Al_2O_3$: 15 to 35% by Mass]

$Al_2O_3$ is a component for adjusting the viscosity and melting point of molten slag and has an effect of improving the shape of a bead during welding. However, when the $Al_2O_3$ content is less than 15% by mass, the above-mentioned effect cannot be sufficiently obtained. Whereas, when the $Al_2O_3$ content exceeds 35% by mass, the melting point of the molten slag becomes excessively high, thus degrading the shape of the bead in welding. Therefore, the $Al_2O_3$ content is set at 15 to 35% by mass.

From the perspective of adjusting the viscosity and melting point of the molten slag, the $Al_2O_3$ content is preferably 20% by mass or more, and more preferably 23% by mass or more. Furthermore, from the perspective of the appropriate melting point of the molten slag, the $Al_2O_3$ content is preferably 30% by mass or less, and more preferably 28% by mass or less. This restriction can further improve the shape of the bead.

Here, the term "$Al_2O_3$ content" as used herein means a value obtained by expressing, in terms of $Al_2O_3$, the whole Al content in the flux that is determined by analysis with a method defined by JIS Z 3352 (e.g., JIS M 8220 and the like). The whole Al content measured by this method sometimes contains other components, such as $AlF_3$, in addition to $Al_2O_3$. However, the contents of these other components are very little. Thus, the $Al_2O_3$ content (the whole Al content in terms of $Al_2O_3$) set in the above-mentioned range does not affect the effects of $Al_2O_3$.

[$SiO_2$: 10 to 30% by Mass]

$SiO_2$ has the effect of mainly improving the outer appearance and shape of the bead by imparting the appropriate viscosity to the molten slag. However, when the $SiO_2$ content is less than 10% by mass, the above-mentioned effect is not sufficiently obtained, thus degrading the outer appearance and shape of the bead. When the $SiO_2$ content exceeds 30% by mass, which means that the $SiO_2$ content becomes excessive, the slag removability is degraded, and burning of the slags onto a weld bead becomes severe. Therefore, the $SiO_2$ content is set at 10 to 30% by mass.

From the perspective of improving the outer appearance and shape of the bead, the $SiO_2$ content is preferably 15% by mass or more, and more preferably 18% by mass or more. Furthermore, in view of the appropriate viscosity of the molten slag, the $SiO_2$ content is preferably 25% by mass or less, and more preferably 22% by mass or less.

Here, the term "$SiO_2$ content" as used herein means a value obtained by expressing, in terms of $SiO_2$, the whole Si content in the flux that is determined by analysis with the method defined by JIS Z 3352 (e.g., JIS M 8214 and the like). The whole Si content measured by this method sometimes contains other components in addition to $SiO_2$, including a Si added in the form of an alloy, such as a Fe—Si alloy. However, the $SiO_2$ content (the whole Si content in terms of $SiO_2$) set in the above-mentioned range does not affect the effects of $SiO_2$ mentioned above.

[MgO: 10 to 25% by Mass]

MgO is a component that significantly contributes to improving the slag removability, and thus is essential for ensuring the adequate slag removability regardless of the type of a welding power source. However, when the MgO content is less than 10% by mass, the effect of MgO cannot be sufficiently obtained. Whereas, when the MgO content exceeds 25% by mass, the shape of the bead is degraded, whereby defects, including slag inclusion, lack of fusion, and undercut, are more likely to occur, depending on the type of the welding power source. In particular, in the AC welding power source, the welding defects, such as the slag inclusion and the lack of fusion, mentioned above, occur remarkably. Therefore, the MgO content is set at 10 to 25% by mass.

From the viewpoint of improving the slag removability, the MgO content is preferably 13% by mass or more, and more preferably 15% by mass or more. Furthermore, from the perspective of suppression of occurrence of the defects, the MgO content is preferably 25% by mass or less, and more preferably 22% by mass or less.

Here, the term "MgO content" as used herein means a value obtained by expressing, in terms of MgO, the whole Mg content in the flux that is determined by analysis with the method defined by JIS Z 3352 (e.g., JIS M 8222 and the like). The whole Mg content measured by this method sometimes contains other components, such as $MgF_2$, in addition to MgO. However, the contents of these other components are very little. Thus, the MgO content (the whole Mg content in terms of MgO) set in the above-mentioned range does not affect the effects of MgO mentioned above.

[F (in Terms of $CaF_2$) 10 to 25% by Mass]

A fluoride, such as $CaF_2$, has the effect of enhancing the electric conductivity and fluidity of the molten slag. The fluoride is one of components that affect the high-temperature viscosity of the molten slag. This effect is in proportion to the F content, like CaO to be mentioned later. Specifically, the F content (in terms of $CaF_2$) of less than 10% by mass cannot sufficiently exhibit the above-mentioned effect, and cannot also expect another effect of promoting exhaust of CO gas from the molten slag to improve resistance to pockmark.

Whereas, when the F content (in terms of $CaF_2$) exceeds 25% by mass, the fluidity of the molten slag becomes excessively high, thereby degrading the shape of the bead. Thus, the F content (in terms of $CaF_2$) is set at 10 to 25% by mass. From the viewpoint of improving the resistance to pockmark, the F content (in terms of $CaF_2$) is preferably 13% by mass or more, and more preferably 15% by mass or more. Furthermore, from the viewpoint of improving the shape of the bead, the F content (in terms of $CaF_2$) is preferably 22% by mass or less, and more preferably 20% by mass or less.

Here, the term "F content" as used herein means a value obtained by expressing, in terms of $CaF_2$, the whole F content in the flux that is determined by analysis with the method defined by JIS Z 3352 (e.g., JISK 1468-2 and the like). The fluoride component in the flux of the present embodiment is mainly $CaF_2$, but sometimes includes $AlF_3$, $MgF_2$, etc., in addition thereto. The F content (the whole F content in terms of $CaF_2$) in the above-mentioned range does not affect the aforesaid effect of the fluoride.

[Mn (in Terms of MnO): 3 to 20% by Mass]

Mn is a component affecting the viscosity and solidification temperature of the molten slag, while improving the resistance to pockmark. Mn is added, mainly in the form of oxide, such as MnO, $MnO_2$, and $Mn_2O_3$. Among various forms, particularly, the addition of Mn in the form of manganese monoxide (MnO) exhibits the effectiveness of Mn. When the Mn content (in terms of MnO) is less than 3% by mass, the effects of the Mn cannot be sufficiently exhibited. When the Mn content exceeds 20% by mass, the slag becomes brittle, degrading the slag removability. Thus, the Mn content (in terms of MnO) is set at 3 to 20% by mass.

In view of improving the resistance to pockmark, the Mn content (in terms of MnO) is preferably 6% by mass or more, and more preferably 8% by mass or more. Furthermore, from the viewpoint of improving the slag removability, the Mn content (in terms of MnO) is preferably 15% by mass or less, and more preferably 12% by mass or less. Here, the term "Mn content" as used herein means a value obtained by expressing, in terms of MnO, the whole Mn content in the flux that is determined by analysis with the method defined by JIS Z 3352 (e.g., JIS M 8232 and the like).

[Na (in Terms of $Na_2O$) and/or K (in Terms of $K_2O$): 0.5 to 8.5% by Mass in Total]

Na and K are components that mainly affect the arc stability and moisture absorption properties of the flux in welding. Na and K are added, mainly in the form of oxide, such as $Na_2O$ and $K_2O$. However, when the total of the Na content (in terms of $Na_2O$) and the K content (in terms of $K_2O$) is less than 0.5% by mass, the arc voltage in welding becomes unstable, thus degrading the outer appearance and shape of the bead.

Whereas, when the total of the Na content (in terms of $Na_2O$) and the K content (in terms of $K_2O$) exceeds 8.5% by mass, the moisture absorption properties of the flux are degraded, and the arc becomes too strong and unstable, which degrades the outer appearance and shape of the bead. Thus, the total of the Na content (in terms of $Na_2O$) and the K content (in terms of $K_2O$) is set at 0.5 to 8.5% by mass. The flux of the present embodiment may have at least one of Na and K added thereto.

From the perspective of stabilizing the arc voltage, the total of the Na content (in terms of $Na_2O$) and the K content (in terms of $K_2O$) is preferably 1.5% by mass or more, and more preferably, 2.5% by mass or more. Furthermore, in view of the moisture absorption properties of the flux, the total of Na content (in terms of $Na_2O$) and the K content (in terms of $K_2O$) is preferably 6.5% by mass or less, and more preferably 5.5% by mass or less.

Here, the term "Na content and K content" as used herein means a value obtained by expressing, in terms of NaO and $K_2O$, respectively, the whole Na content and whole K content in the flux that are determined by analysis with the method defined by JIS Z 3352 (e.g., JIS M 8852 and the like). The Na component and K component of the flux in the present embodiment are mainly $Na_2O$ and $K_2O$, respectively, but sometimes include $NaAlSi_3O_8$, $KAlSi_3O_8$, and the like in addition thereto.

[Fe (in Terms of FeO): 0.5 to 8% by Mass]

Fe has the effect of promoting deoxidation phenomenon to enhance the resistance to pockmark, and is added, mainly in the form of metal powder made of Fe—Si and the like. When the Fe content (in terms of FeO) is less than 0.5% by mass, particularly, in the use of the DC welding power source, the above-mentioned effect cannot be sufficiently obtained in proportion to the amount of presence of Fe. Whereas, the Fe content (in terms of FeO) exceeding 8% by mass affects the solidification temperature of the slag, thus degrading the outer appearance and shape of the bead and the slag removability. Therefore, the Fe content (in terms of FeO) is set at 0.5 to 8% by mass.

In view of the resistance to pockmark, the Fe content (in terms of FeO) is preferably 1% by mass or more, and more preferably 2% by mass or more. Taking into consideration the influence on the solidification temperature of a slag, the Fe content (in terms of FeO) is preferably 6% by mass or less, and more preferably 4% by mass or less.

Here, the term "Fe content" as used herein means a value obtained by expressing, in terms of FeO, the whole Fe content in the flux that is determined by analysis with the method defined by JIS Z 3352 (e.g., JIS M 8202 and the like). The Fe content sometimes covers, in addition to the Fe content added as the metal powder, the content of FeO, $Fe_2O_3$, $Fe_3O_4$, etc., that is added as inevitable impurities.

[CaO (Corresponding Value): 6% by Mass or Less]

CaO is a component that increases the basicity of the slag, thereby enhancing the cleaning degree of weld metal, and also affects the fluidity of the molten slag. CaO exhibits the aforesaid effects in proportion to the amount of presence of CaO. However, when the CaO content exceeds 6% by mass, the fluidity of the molten slag becomes excessive to degrade the outer appearance and shape of the bead. Therefore, the CaO content is restricted to 6% by mass or less.

From the perspective of the fluidity of the molten slag, the CaO content is preferably 4% by mass or less, and more preferably 3% by mass or less.

The flux in the present embodiment includes $CaF_2$ mentioned above, as a Ca component, in addition to CaO. Here, the term "CaO content" as used herein means a corresponding value determined from the whole Ca content and the whole F content that are obtained by analysis with the method defined by JIS Z 3352. Thus, if the $CaF_2$ content is very large, a CaO content can be zero (0) according to JIS Z 3352 in some cases.

[Water-Soluble $SiO_2$: Less than 1% by Mass]

As the content of water-soluble $SiO_2$ is 1% by mass or more, the resistance to moisture absorption of the flux is degraded, and the diffusion hydrogen content of the weld metal is increased. Therefore, the water-soluble $SiO_2$ content is restricted to less than 1% by mass. From the perspective of improving the resistance to moisture absorption and reducing the diffusion hydrogen content, the water-soluble $SiO_2$ content is preferably 0.8% by mass or less, and more preferably 0.6% by mass or less.

The water-soluble $SiO_2$ is derived mainly from a binder, such as liquid glass. To reduce its content, it is effective to sinter the flux at a temperature equal to or higher than a temperature at which the binder is less likely to absorb moisture. Specifically, the sintering temperature is most preferably set at 800° C. or higher.

The water-soluble $SiO_2$ content in the flux can be measured by the following method. First, the flux was crushed into a particle size of 300 μm or less by a vibrational mill, followed by sampling about 0.2 g of each specimen for measurement therefrom (step 1). Then, the above-mentioned specimen and 100 ml of distilled water were charged into a conical flask made of quartz, and boiled for 4 hours, thereby extracting a soluble component (step 2). After leaving the extracted solution for 12 hours or more, precipitates, floating substances and the like in the extracted solution were removed, and then the Si content is quantified by an absorption photometry (step 3).

Here, the term "water-soluble $SiO_2$" as used herein means a value obtained by expressing, in terms of $SiO_2$, the whole Si content in the flux determined by analysis using the method mentioned above, but is discriminated from the above-mentioned whole $SiO_2$ and has its content specified.

[[MgO]/([Al$_2$O$_3$]+[MnO]): 0.2 to 0.8]

The respective contents of MgO, $Al_2O_3$, and Mn are specified. Further, the flux in this embodiment also specifies the ratio of the MgO content to the total of the $Al_2O_3$ content and the Mn content (in terms of MnO) (=[MgO]/([Al$_2$O$_3$]+[MnO])).

The inventors have studied by experiments about the moisture absorption properties and welding workability of the flux with MgO added thereto, and found out that the ratio of the MgO content to the total of the $Al_2O_3$ content and Mn content (in terms of MnO) (=[MgO]/([Al$_2$O$_3$]+[MnO])) significantly affects the moisture absorption properties and welding workability. For example, in the use of the DC welding power source, the flux consumption is increased, compared to the use of the AC welding power source. Thus, the Si content in the weld metal is increased to drastically degrade the slag removability. Here, the slag removability can be improved by addition of MgO.

However, since MgO has excellent hydration properties, the addition of MgO into the flux degrades the moisture absorption properties, thereby increasing the diffusion hydrogen content in the weld metal. Whereas, $Al_2O_3$ and Mn are non-hydrous components, and have the great effect of improving the moisture absorption properties if being added. Unlike the technical knowledge in the related art, it is found out that among them, Mn is used in combination with $Al_2O_3$ to exhibit the effect of improving the moisture absorption properties of the flux to contribute to decreasing the diffusion hydrogen content.

When [[MgO]/([Al$_2$O$_3$]+[MnO]) is less than 0.2, the slag removability is drastically degraded during welding by the DC welding power source. When [[MgO]/([Al$_2$O$_3$]+[MnO]) exceeds 0.8, the moisture absorption properties are degraded, thus increasing the diffusion hydrogen content in the weld metal. The amount of each component added is adjusted such that the ratio of [MgO]/([Al$_2$O$_3$]+[MnO]) is in a range of 0.2 to 0.8. Thus, the degradation in moisture absorption properties can be suppressed.

[$TiO_2$: 8% by Mass or Less]

The flux of this embodiment may contain $TiO_2$, in addition to the above-mentioned components. $TiO_2$ is a component that is effective in improving the slab removability and has the effect of making the shape of the bead better. Part of $TiO_2$ is converted into Ti by a reduction reaction in welding, and this Ti is added into the weld metal, contributing to improving the toughness of the flux.

The above-mentioned effect is in proportion to the amount of presence of $TiO_2$ ($TiO_2$ content). When the upper limit of $TiO_2$ content exceeds 8% by mass, the shape of the bead is degraded. The lower limit of $TiO_2$ content is not specifically limited, but is preferably 1% by mass or more from the viewpoint of the slag removability and the bead shape.

When $TiO_2$ is added to the flux, the following formula 4 is preferably satisfied. Thus, the addition of $TiO_2$ in this way can enhance the effect of further improving the welding workability by the DC welding power source while reducing the diffusion hydrogen content in the weld metal. [$TiO_2$] in the following formula 4 is a $TiO_2$ content.

$$0.2 \leq [MgO]/([Al_2O_3]+[MnO]+[TiO_2]) \leq 0.8 \quad \text{[Formula 4]}$$

Here, the term "$TiO_2$ content" as used herein means a value obtained by expressing, in terms of $TiO_2$, the whole Ti content in the flux that is determined by analysis with the method defined by JIS Z 3352 (e.g., JIS M 8219 and the like).

[C: 0.2% by Mass or Less]

C is derived from a carbonate included as an impurity in each raw material of the flux, and inevitably introduced thereinto. Whereas, in the use of the DC welding power source as mentioned above, the consumption of the flux is increased, and the decomposition of the carbonate is further promoted, compared to the use of the AC welding power source. Thus, even if the C content is very small, a large volume of CO gas and $CO_2$ gas is generated during welding, leading to degradation in the resistance to pockmark and the outer appearance and shape of the bead. Thus, to prevent the degradation in welding workability, the C content in the flux is preferably reduced to 0.2% by mass or less.

In particular, from the perspective of improving the resistance to pockmark, the C content is preferably restricted to 0.1% by mass or less, and more preferably 0.05% by mass or less. To keep the resistance to pockmark adequate, the C content is preferably as small as possible. The term "C content" as used herein means a value determined by analysis with the method defined by JIS Z 2615 (e.g., JIS M 8219 etc.)

[Other Components}

Other components except for the above-mentioned components in the flux of the present embodiment include Zr, Ba, Li, P and S. Among these inevitable impurities, each of Zr, Ba and Li is preferably restricted to 1.0% by mass or less, and particularly, each of P and S that affect the quality of weld metal is preferably restricted to 0.05% by mass or less.

[Manufacturing Method]

When manufacturing the flux in the present embodiment, for example, the raw material powder is blended to have the above-mentioned composition, then mixed and kneaded together with a binder, granulated, and sintered. At this time, for example, aqueous solutions, such as polyvinyl alcohol, and liquid glass can be used as bonding agents (binders). Granulation methods are not specifically limited, but may preferably include method using a rolling granulator, an extrusion granulator and the like.

Further, the granulated flux is preferably subjected to grain-size regulation, including dust removal and crushing of coarse grains, to have grains with a grain size of 2.5 mm or less. Whereas, the sintering process after the granulation can be performed by a rotary kiln, a stationary batch furnace, a belt baking furnace and the like. The sintering temperature at this time can be set, for example, at 600 to 1,200° C. From the viewpoint of making the binder less likely to absorb moisture as mentioned above, the sintering temperature is preferably set at 800° C. or higher.

As mentioned above in detail, the flux of the present embodiment sets the content of each component in a corresponding specific range, and adjusts the contents of the respective components such that the ratio of the Mg content to the total of the Al content and Mn content falls within a specific range. Thus, even if the welding power source is of either the AC or DC type, it is possible to make the welding workability better and to reduce the diffusion hydrogen content in the weld metal.

EXAMPLES

The effects of the present invention will be specifically described by way of Examples and Comparative Examples of the present invention. In Examples, submerged arc welding tests were performed using steel plates shown in Table 1 below and wires shown in Table 2 while the steel plates have the shape of a groove shown in FIG. 1, under welding conditions (A or B) shown in Table 3 below. The performances of the fluxes in Examples shown in Table 4 below and in Comparative Examples shown in Table 5 below were evaluated. In Examples, raw materials were blended to have the composition shown in Tables 4 and 5, then mixed and kneaded together with a binder (liquid glass), granulated, and further sintered using a rotary kiln at the temperatures shown in Table 4 and 5 below, followed by the grain-size regulation, whereby the fluxes having the grain size of 2.5 mm or less were obtained.

TABLE 1

| Plate thickness | Composition (% by mass) | | | | |
|---|---|---|---|---|---|
| (mm) | C | Si | Mn | P | S |
| 25 | 0.16 | 0.35 | 1.32 | 0.007 | 0.001 |

TABLE 2

| Composition (% by mass) | | | | |
|---|---|---|---|---|
| C | Si | Mn | P | S |
| 0.14 | 0.01 | 1.93 | 0.012 | 0.005 |

TABLE 3

| No. | Po-larity | Welding current (A) | Arc voltage (V) | Welding speed (cpm) | Wire extension (mm) | Interpass temperature (° C.) |
|---|---|---|---|---|---|---|
| A | DC-EP | 550 | 30 | 42 | 30 | ≤150 |
| B | AC | 550 | 30 | 42 | 30 | ≤150 |

TABLE 4

| | | Flux composition (% by mass) | | | | | | | | | | | | | | |
|---|---|---|---|---|---|---|---|---|---|---|---|---|---|---|---|---|
| | | | SiO$_2$ | | | | | | | | Water- | | | | | Sintering |
| | | Al$_2$O$_3$ | Alloy-derived | Mineral-derived | Total | MgO | F | Mn | Na + K | Fe | CaO | soluble SiO$_2$ | TiO$_2$ | C | M (I) | M (II) | temperature (° C.) |
| Examples | 1 | 26 | 4 | 16 | 20 | 15 | 20 | 10 | 2.5 | 3 | 2 | 0.4 | 2 | 0.013 | 0.42 | 0.39 | 850 |
| | 2 | 35 | 4 | 7 | 11 | 17 | 19 | 10 | 2.6 | 3 | 1 | 0.4 | 2 | 0.016 | 0.38 | 0.36 | 850 |
| | 3 | 16 | 4 | 25 | 29 | 19 | 18 | 9 | 2.4 | 3 | 2 | 0.4 | 2 | 0.025 | 0.76 | 0.70 | 850 |
| | 4 | 34 | 4 | 15 | 19 | 10 | 18 | 10 | 2.4 | 3 | 2 | 0.4 | 2 | 0.023 | 0.23 | 0.22 | 850 |
| | 5 | 16 | 4 | 15 | 19 | 25 | 17 | 13 | 2.4 | 3 | 2 | 0.5 | 3 | 0.019 | 0.86 | 0.78 | 850 |
| | 6 | 34 | 4 | 14 | 18 | 19 | 11 | 9 | 2.4 | 3 | 2 | 0.4 | 2 | 0.018 | 0.44 | 0.42 | 850 |
| | 7 | 15 | 4 | 16 | 20 | 20 | 24 | 12 | 2.5 | 3 | 2 | 0.4 | 2 | 0.015 | 0.74 | 0.69 | 850 |
| | 8 | 35 | 4 | 14 | 18 | 19 | 16 | 3 | 2.5 | 3 | 2 | 0.4 | 2 | 0.020 | 0.50 | 0.48 | 850 |
| | 9 | 16 | 4 | 13 | 17 | 20 | 18 | 20 | 2.4 | 3 | 2 | 0.4 | 2 | 0.015 | 0.56 | 0.53 | 850 |
| | 10 | 24 | 4 | 25 | 29 | 10 | 17 | 11 | 2.5 | 3 | 2 | 0.4 | 2 | 0.018 | 0.29 | 0.27 | 850 |
| | 11 | 27 | 4 | 7 | 11 | 24 | 16 | 13 | 2.5 | 3 | 2 | 0.4 | 2 | 0.022 | 0.60 | 0.57 | 850 |
| | 12 | 25 | 4 | 26 | 30 | 16 | 10 | 10 | 2.5 | 3 | 2 | 0.4 | 2 | 0.030 | 0.46 | 0.43 | 850 |
| | 13 | 26 | 4 | 7 | 11 | 18 | 24 | 11 | 2.6 | 3 | 2 | 0.4 | 3 | 0.025 | 0.49 | 0.45 | 850 |
| | 14 | 26 | 4 | 25 | 29 | 16 | 17 | 3 | 2.6 | 3 | 2 | 0.4 | 2 | 0.032 | 0.55 | 0.52 | 850 |
| | 15 | 25 | 4 | 6 | 10 | 17 | 19 | 19 | 2.5 | 3 | 3 | 0.4 | 2 | 0.013 | 0.39 | 0.37 | 850 |
| | 16 | 23 | 5 | 16 | 21 | 25 | 12 | 10 | 2.3 | 4 | 2 | 0.4 | 1 | 0.046 | 0.76 | 0.74 | 850 |
| | 17 | 25 | 4 | 16 | 20 | 11 | 25 | 11 | 2.4 | 3 | 2 | 0.4 | 1 | 0.014 | 0.31 | 0.30 | 850 |
| | 18 | 27 | 4 | 15 | 19 | 24 | 17 | 4 | 2.3 | 3 | 2 | 0.4 | 2 | 0.024 | 0.77 | 0.73 | 850 |
| | 19 | 26 | 4 | 14 | 18 | 10 | 18 | 19 | 2.3 | 3 | 2 | 0.4 | 2 | 0.019 | 0.22 | 0.21 | 850 |
| | 20 | 25 | 4 | 15 | 19 | 20 | 25 | 3 | 2.4 | 3 | 2 | 0.4 | 1 | 0.032 | 0.71 | 0.69 | 850 |
| | 21 | 26 | 4 | 14 | 18 | 18 | 11 | 19 | 2.6 | 3 | 2 | 0.4 | 1 | 0.028 | 0.40 | 0.39 | 850 |
| | 22 | 27 | 4 | 18 | 22 | 16 | 19 | 10 | 0.6 | 3 | 2 | 0.5 | 1 | 0.015 | 0.43 | 0.42 | 800 |
| | 23 | 28 | 4 | 17 | 21 | 18 | 11 | 9 | 8.3 | 3 | 0 | 0.6 | 2 | 0.016 | 0.43 | 0.41 | 800 |
| | 24 | 26 | 1 | 20 | 21 | 18 | 17 | 11 | 2.5 | 0.6 | 2 | 0.5 | 2 | 0.025 | 0.49 | 0.46 | 800 |
| | 25 | 24 | 10 | 9 | 19 | 18 | 15 | 11 | 2.6 | 8 | 2 | 0.6 | 1 | 0.021 | 0.51 | 0.50 | 800 |
| | 26 | 26 | 4 | 16 | 20 | 16 | 20 | 11 | 2.5 | 3 | 2 | 0.4 | 0 | 0.019 | 0.43 | 0.43 | 850 |
| | 27 | 21 | 4 | 14 | 18 | 23 | 16 | 10 | 2.5 | 3 | 2 | 0.5 | 5 | 0.015 | 0.74 | 0.64 | 800 |
| | 28 | 20 | 4 | 13 | 17 | 22 | 17 | 9 | 2.6 | 3 | 2 | 0.5 | 8 | 0.028 | 0.76 | 0.59 | 800 |
| | 29 | 27 | 4 | 16 | 20 | 14 | 19 | 10 | 2.5 | 3 | 3 | 0.1 | 2 | 0.032 | 0.38 | 0.36 | 900 |
| | 30 | 28 | 4 | 16 | 20 | 14 | 18 | 10 | 2.5 | 3 | 3 | <0.1 | 2 | 0.022 | 0.37 | 0.35 | 1,000 |
| | 31 | 19 | 4 | 22 | 26 | 16 | 17 | 9 | 2.4 | 3 | 6 | 0.4 | 2 | 0.031 | 0.57 | 0.53 | 850 |
| | 32 | 26 | 4 | 16 | 20 | 15 | 20 | 10 | 2.5 | 3 | 2 | 0.4 | 2 | 0.18 | 0.42 | 0.39 | 850 |

TABLE 5

| | | | Flux composition (% by mass) | | | | | | | | | | | | | | |
|---|---|---|---|---|---|---|---|---|---|---|---|---|---|---|---|---|---|
| | | | SiO₂ | | | | | | Na + | | | Water-soluble | | | | | Sintering temperature |
| | | Al₂O₃ | Alloy-derived | Mineral-derived | Total | MgO | F | Mn | K | Fe | CaO | SiO₂ | TiO₂ | C | M (I) | M (II) | (° C.) |
| Comparative Examples | 1 | 38 | 3 | 14 | 17 | 13 | 16 | 9 | 2.4 | 2 | 2 | 0.4 | 1 | 0.019 | 0.28 | 0.27 | 850 |
| | 2 | 13 | 4 | 23 | 27 | 19 | 20 | 11 | 2.4 | 3 | 3 | 0.5 | 2 | 0.024 | 0.79 | 0.73 | 850 |
| | 3 | 18 | 4 | 28 | 32 | 15 | 15 | 10 | 2.6 | 3 | 3 | 0.4 | 2 | 0.027 | 0.54 | 0.50 | 850 |
| | 4 | 28 | 4 | 2 | 6 | 20 | 24 | 13 | 2.5 | 3 | 2 | 0.4 | 2 | 0.016 | 0.49 | 0.47 | 850 |
| | 5 | 21 | 4 | 12 | 16 | 29 | 16 | 9 | 2.4 | 3 | 2 | 0.4 | 2 | 0.018 | 0.97 | 0.91 | 850 |
| | 6 | 28 | 4 | 24 | 28 | 7 | 12 | 12 | 2.6 | 3 | 6 | 0.4 | 2 | 0.032 | 0.18 | 0.17 | 850 |
| | 7 | 22 | 4 | 13 | 17 | 15 | 28 | 9 | 2.5 | 3 | 2 | 0.5 | 2 | 0.028 | 0.48 | 0.45 | 850 |
| | 8 | 27 | 5 | 14 | 19 | 23 | 8 | 12 | 2.4 | 4 | 2 | 0.6 | 3 | 0.016 | 0.59 | 0.55 | 850 |
| | 9 | 22 | 4 | 11 | 15 | 15 | 14 | 24 | 2.5 | 3 | 3 | 0.5 | 2 | 0.017 | 0.33 | 0.31 | 850 |
| | 10 | 28 | 4 | 16 | 20 | 22 | 20 | 1 | 2.6 | 3 | 2 | 0.6 | 2 | 0.025 | 0.76 | 0.71 | 850 |
| | 11 | 27 | 4 | 14 | 18 | 19 | 17 | 11 | 0.1 | 3 | 2 | 0.5 | 3 | 0.041 | 0.50 | 0.46 | 800 |
| | 12 | 26 | 4 | 15 | 19 | 17 | 14 | 10 | 9.5 | 3 | 0 | 0.4 | 2 | 0.027 | 0.47 | 0.45 | 800 |
| | 13 | 26 | 0 | 21 | 21 | 19 | 17 | 11 | 2.5 | 0.2 | 2 | 0.5 | 2 | 0.015 | 0.51 | 0.49 | 800 |
| | 14 | 24 | 13 | 6 | 19 | 18 | 15 | 9 | 2.6 | 10 | 2 | 0.6 | 1 | 0.019 | 0.55 | 0.53 | 800 |
| | 15 | 21 | 4 | 14 | 18 | 21 | 14 | 9 | 2.5 | 3 | 2 | 0.5 | 10 | 0.018 | 0.70 | 0.53 | 800 |
| | 16 | 27 | 4 | 16 | 20 | 14 | 19 | 10 | 2.5 | 3 | 3 | 1.5 | 2 | 0.028 | 0.38 | 0.36 | 600 |
| | 17 | 16 | 4 | 17 | 21 | 24 | 21 | 8 | 2.5 | 3 | 3 | 0.6 | 2 | 0.026 | 1.00 | 0.92 | 850 |
| | 18 | 34 | 4 | 7 | 11 | 10 | 11 | 19 | 2.4 | 3 | 3 | 0.4 | 7 | 0.029 | 0.19 | 0.17 | 850 |
| | 19 | 23 | 4 | 18 | 22 | 16 | 15 | 9 | 2.4 | 3 | 8 | 0.4 | 2 | 0.015 | 0.28 | 0.27 | 850 |
| | 20 | 26 | 4 | 16 | 20 | 15 | 20 | 10 | 2.5 | 3 | 2 | 0.4 | 2 | 0.43 | 0.42 | 0.39 | 850 |

The balance of the steel plate composition shown in the above Table 1 and of the wire composition shown in the above Table 2 is Fe and inevitable impurities. "M(I)" shown in the above Tables 4 and 5 indicates a value of [MgO]/ ([Al₂O₃]+[MnO]), and "M(II)" indicates a value of [MgO]/ ([Al₂O₃]+[MnO]+[TiO₂]).

The respective fluxes in Examples and Comparative Examples were evaluated for the diffusion hydrogen content in the weld metal, the bead outer appearance, the bead shape, the slag removability, and the welding defect (intrinsic and extrinsic defects).

<Diffusion Hydrogen Content>

A diffusion hydrogen content in the weld metal was measured based on the method defined by JIS Z 3118 in principle.

<Bead Outer Appearance>

The outer appearance of a bead, mainly regarding the waved shape and luster of the bead, was evaluated by visually observing a welded part. As a result, samples having beads with metallic luster without any disturbed part of the bead waved shape were rated "A"; samples having beads with metallic luster and one disturbed part of the bead waved shape per unit welding length (1 m) were rated "B"; samples having beads without any metallic luster and with two to four disturbed parts of the bead waved shape per unit welding length (1 m) were rated "C"; and samples having beads without any metallic luster and with five or more disturbed parts of the bead waved shape per unit welding length (1 m) were rated "D".

<Bead Shape>

The shape of a bead, mainly regarding uneven part of the bead and wettability to the base metal, was evaluated by visually observing the welded part of each sample. As a result, samples having beads with a very good shape were rated "A"; samples having beads with a good shape were rated "B"; samples having beads with a slightly defective shape were rated "C"; and samples having beads with a defective shape were rated "D".

<Slag Removability>

The slag removability was evaluated based on the easiness of slag removal and the presence or absence of slag burning. Specifically, samples from which the slag was naturally removed with no burning were rated "A"; samples from which the slag was naturally removed with three or less burned parts per unit welding length (1 m) were rated "B"; samples from which the slag was not naturally removed with four to nine burned parts per unit welding length (1 m) were rated "C"; and samples from which the slag was not naturally removed with ten or more burned parts per unit welding length (1 m) were rated "D".

<Arc Stability>

The arc stability was evaluated based on the amplitude of voltage and current oscillations during welding. Specifically, samples having the welding current of ±50 A and the arc voltage of ±2 V were rated "A"; samples having the welding current of ±100 A and the arc voltage of ±2 V were rated "B"; samples having the welding current of ±100 A and the arc voltage of ±4 V were rated "C"; and samples in which welding was difficult to perform were rated "D".

<Welding Defects>

Welding defects (intrinsic defects) generated in the weld metal, mainly regarding a pore defect, a slag inclusion, lack of fusion, and the like, were evaluated. Samples with no welding defects were rated "A"; samples having a rate of occurrence of the welding defects per unit welding length (1 m) of 0.5% or less were rated "B"; samples having a rate of occurrence of the welding defects per unit welding length (1 m) exceeding 0.5% and of 1.0% or less were rated "C"; and samples having a rate of occurrence of the welding defects per unit welding length (1 m) exceeding 1.0% were rated "D".

Whereas, the welding defects (extrinsic defects), mainly regarding welding defects generated at the surface of the weld metal, such as an undercut part and a pockmark, were evaluated. Samples with no welding defects were rated "A"; samples having a rate of occurrence of the welding defects per unit welding length (1 m) of 0.5% or less were rated "B"; samples having a rate of occurrence of the welding defects per unit welding length (1 m) exceeding 0.5% and of 1.0% or less were rated "C"; and samples having a rate of occurrence of the welding defects per unit welding length (1 m) exceeding 1.0% were rated "D".

The above-mentioned evaluation results are collectively shown in Tables 6 and 7 below.

TABLE 6

| | | Evaluation results | | | | | | | | | | | |
|---|---|---|---|---|---|---|---|---|---|---|---|---|---|
| | | | Welding conditions A | | | | | | Welding conditions B | | | | |
| | | Diffusion hydrogen content (ml/100 g) | Bead outer appearance | Bead shape | Slag removability | Arc stability | Welding defect (intrinsic) | Welding defect (extrinsic) | Bead outer appearance | Bead shape | Slag removability | Arc stability | Welding defect (intrinsic) | Welding defect (extrinsic) |
| Examples | 1 | 2.3 | A | A | A | A | A | A | A | A | A | A | A | A |
| | 2 | 2.1 | A | B | A | A | A | A | A | B | A | A | A | A |
| | 3 | 2.6 | A | B | B | A | A | A | A | B | B | A | A | A |
| | 4 | 2.5 | A | B | B | A | A | A | A | B | B | A | A | A |
| | 5 | 3.4 | A | B | A | A | A | B | A | B | A | A | A | B |
| | 6 | 3.3 | B | B | A | A | A | B | B | B | A | A | A | B |
| | 7 | 2.4 | A | B | A | A | A | A | A | B | A | A | A | A |
| | 8 | 2.3 | A | B | B | A | A | B | A | B | B | A | A | B |
| | 9 | 2.3 | A | B | B | A | A | A | A | B | B | A | A | A |
| | 10 | 2.5 | A | A | B | A | A | A | A | A | B | A | A | A |
| | 11 | 3.5 | B | B | A | A | B | B | B | B | A | A | B | B |
| | 12 | 2.3 | A | A | B | A | A | B | A | A | B | A | A | B |
| | 13 | 2.4 | B | B | A | A | A | A | B | B | A | A | A | A |
| | 14 | 2.2 | A | A | B | A | A | B | A | A | B | A | A | B |
| | 15 | 2.4 | B | B | B | A | A | A | B | B | B | A | A | A |
| | 16 | 3.4 | A | B | A | A | B | B | A | B | A | A | B | B |
| | 17 | 2.1 | A | B | B | A | A | A | A | B | B | A | A | A |
| | 18 | 3.2 | A | B | A | A | A | B | A | B | A | A | A | B |
| | 19 | 2.4 | A | A | B | A | A | A | A | A | B | A | A | A |
| | 20 | 2.2 | A | B | A | A | A | A | A | B | A | A | A | A |
| | 21 | 2.2 | A | A | B | A | A | B | A | A | B | A | A | B |
| | 22 | 2.5 | B | B | A | B | A | A | B | B | A | B | A | A |
| | 23 | 3.1 | B | B | A | B | A | A | B | B | A | B | A | A |
| | 24 | 2.8 | A | A | A | A | A | B | A | A | A | A | A | B |
| | 25 | 2.7 | B | B | B | A | A | A | B | B | B | A | A | A |
| | 26 | 2.3 | A | A | A | A | A | A | A | A | A | A | A | A |
| | 27 | 2.9 | A | A | A | A | A | A | A | A | A | A | A | A |
| | 28 | 3.0 | A | B | A | A | A | A | A | B | A | A | A | A |
| | 29 | 1.7 | A | A | A | A | A | A | A | A | A | A | A | A |
| | 30 | 1.5 | A | A | A | A | A | A | A | A | A | A | A | A |
| | 31 | 2.5 | B | B | A | A | A | A | B | B | A | A | A | A |
| | 32 | 2.6 | A | A | A | A | A | B | A | A | A | A | A | A |

TABLE 7

| | | Evaluation results | | | | | | | | | | | |
|---|---|---|---|---|---|---|---|---|---|---|---|---|---|
| | | | Welding conditions A | | | | | | Welding conditions B | | | | |
| | | Diffusion hydrogen content (ml/100 g) | Bead outer appearance | Bead shape | Slag removability | Arc stability | Welding defect (intrinsic) | Welding defect (extrinsic) | Bead outer appearance | Bead shape | Slag removability | Arc stability | Welding defect (intrinsic) | Welding defect (extrinsic) |
| Comparative Examples | 1 | 2.2 | B | D | B | B | B | B | B | D | B | B | B | B |
| | 2 | 2.6 | B | C | B | B | B | B | B | C | B | B | B | B |
| | 3 | 2.2 | B | B | D | B | B | B | B | B | C | B | B | B |
| | 4 | 2.7 | C | C | B | B | B | B | C | C | B | B | B | B |
| | 5 | 3.7 | B | C | B | B | C | C | B | C | B | B | D | D |
| | 6 | 1.8 | B | B | D | B | B | B | B | B | C | B | B | B |
| | 7 | 2.3 | B | D | B | B | B | B | B | D | B | B | B | B |
| | 8 | 3.4 | B | B | B | B | B | C | B | B | B | B | B | C |
| | 9 | 2.5 | B | B | D | B | B | B | B | B | C | B | B | B |
| | 10 | 3.1 | B | B | B | B | B | C | B | B | B | B | B | C |
| | 11 | — | | | | | difficult-to-weld | | | | | | | |
| | 12 | 3.8 | C | C | B | B | B | B | C | C | B | B | B | B |
| | 13 | 2.8 | B | B | B | B | B | D | B | B | B | B | B | C |
| | 14 | 2.7 | C | C | D | B | B | B | C | C | C | B | B | B |
| | 15 | 2.9 | B | C | B | B | B | B | B | C | B | B | B | B |
| | 16 | 5.5 | A | A | A | A | A | A | A | A | A | A | A | A |
| | 17 | 4.9 | A | A | A | A | A | A | A | A | A | A | A | A |
| | 18 | 1.9 | B | B | D | B | B | B | B | B | C | B | B | B |
| | 19 | 2.5 | D | D | B | B | B | B | D | D | B | B | B | B |
| | 20 | 2.3 | A | A | A | A | A | D | A | A | A | A | A | C |

In the flux of Comparative Example No. 1 shown in Table 7, an Al$_2$O$_3$ content exceeded 35% by mass, resulting in defective bead shape. Whereas, in the flux of Comparative Example No. 2, an Al$_2$O$_3$ content was less than 15% by mass, resulting in inferior bead shape. In the flux of Comparative Example No. 3, a SiO$_2$ content exceeded 30% by mass, resulting in inferior slag removability. Whereas, in the flux of Comparative Example No. 4, a SiO$_2$ content was less than 10% by mass, resulting in inferior bead outer appearance and bead shape.

In the flux of Comparative Example No. 5, an MgO content exceeded 25% by mass, resulting in inferior bead shape, further generating welding defects inside and at the surface of the weld metal. Whereas, in the flux of Comparative Example No. 6, an MgO content was less than 10% by mass, causing burning, resulting in inferior slag removability. In the flux of Comparative Example No. 7, an F content exceeded 25% by mass, resulting in inferior bead shape. Whereas, in the flux of Comparative Example No. 8, an F content is less than 10% by mass, thus generating welding defects, including undercut parts and pockmarks.

In the flux of Comparative Example No. 9, an Mn content (in terms of MnO) exceeded 20% by mass, causing burning, resulting in inferior slag removability. Whereas, in the flux of Comparative Example No. 10, an Mn content (in terms of MnO) was less than 3% by mass, causing welding defects at the surface of the weld metal, including the undercut parts and pockmarks. In the flux of Comparative Example No. 11, the total of a Na content (in terms of Na$_2$O) and a K content (in terms of K$_2$O) was less than 0.5% by mass, so that the arc stability was drastically reduced, and both the bead outer appearance and the bead shape were degraded. As a result, the welding was difficult to perform. Whereas, in the flux of Comparative Example No. 12, the total of a Na content (in terms of Na$_2$O) and a K content (in terms of K$_2$O) exceeded 8.5% by mass, resulting in inferior bead outer appearance and bead shape.

In the flux of Comparative Example No. 13, an Fe content (in terms of FeO) was less than 0.5% by mass, generating welding defects, such as the undercut parts and pockmarks, at the surface of the weld metal. Whereas, in the flux of Comparative Example No. 14, an Fe content (in terms of FeO) exceeded 8% by mass, resulting in inferior bead outer appearance and bead shape, further degrading the slag removability. In the flux of Comparative Example No. 15, a TiO$_2$ content exceeded 8% by mass, thereby degrading the bead shape. Whereas, in the flux of Comparative Example No. 16, the water-soluble SiO$_2$ content was equal to or more than 1.0% by mass, increasing the diffusion hydrogen content in the weld metal.

In the flux of Comparative Example No. 17, since M(II) (=[MgO]/([Al$_2$O$_3$]+[MnO]+[TiO$_2$])) exceeded 0.8, the diffusion hydrogen content in the weld metal was increased. Whereas, in the flux of Comparative Example No. 18, since M(II) was less than 0.2, a number of burned parts were generated, thus drastically degrading the slag removability. In the flux of Comparative Example No. 19, since a CaO content exceeded 6% by mass, the welding defects, including the undercut parts and pockmarks, were generated at the surface of the weld metal. Further, in the flux of Comparative Example No. 20, since a C content in the flux exceeded 0.2% by mass, pockmarks were generated.

In contrast, the fluxes in Examples Nos. 1 to 32 shown in Table 6 satisfied the scope of the present invention, and thus had excellent bead outer appearance, bead shape, slag removability, and arc stability, resulting in no welding defects (intrinsic and extrinsic defects). As can be confirmed from the result mentioned above, the use of the flux in the present invention can improve the welding workability and reduce the diffusion hydrogen content in the weld metal in the use of either AC welding or DC welding.

The invention claimed is:

1. A flux for submerged arc welding, the flux comprising:
Al$_2$O$_3$: 15 to 35% by mass;
SiO$_2$: 10 to 30% by mass;
MgO: 10 to 25% by mass;
F expressed in terms of CaF$_2$: 10 to 25% by mass;
Mn expressed in terms of MnO: 3 to 20% by mass;
Na expressed in terms of Na$_2$O and/or K expressed in terms of K$_2$O: 0.5 to 4.5% by mass in total; and
Fe expressed in terms of FeO: 0.5 to 8% by mass,
wherein
a CaO content is 6% by mass or less,
a water-soluble SiO$_2$ content is less than 1% by mass,
a C content is 0.05% by mass or less, and
the flux satisfies formula (I):

$$0.2 \leq [MgO]/([Al_2O_3]+[MnO]) \leq 0.8 \quad (I)$$

where [Al$_2$O$_3$] is an Al$_2$O$_3$ content, [MgO] is an MgO content, and [MnO] is an Mn content expressed in terms of MnO.

2. The flux according to claim 1, further comprising:
TiO$_2$: 8% by mass or less,
wherein the flux satisfies formula (II):

$$0.2 \leq [MgO]/([Al_2O_3]+[MnO]+[TiO_2]) \leq 0.8 \quad (II)$$

where [TiO$_2$] is a TiO$_2$ content.

3. The flux according to claim 1, wherein the flux is sintered at a temperature of 800° C. or higher.

4. The flux according to claim 2, wherein the flux is sintered at a temperature of 800° C. or higher.

5. A method for submerged arc welding, the method comprising:
welding at least one material with the flux according to claim 1.

6. A weld, made by the method according to claim 5.

7. A composition, comprising:
Al$_2$O$_3$: 15 to 35% by mass;
SiO$_2$: 10 to 30% by mass;
MgO: 10 to 25% by mass;
F expressed in terms of CaF$_2$: 10 to 25% by mass;
Mn expressed in terms of MnO: 3 to 20% by mass;
Na expressed in terms of Na$_2$O and/or K expressed in terms of K$_2$O: 0.5 to 4.5% by mass in total; and
Fe expressed in terms of FeO: 0.5 to 8% by mass,
wherein
a CaO content is 6% by mass or less,
a water-soluble SiO$_2$ content is less than 1% by mass,
a C content is 0.05% by mass or less, and
the composition satisfies formula (I):

$$0.2 \leq [MgO]/([Al_2O_3]+[MnO]) \leq 0.8 \quad (I)$$

where [Al$_2$O$_3$] is an Al$_2$O$_3$ content, [MgO] is an MgO content, and [MnO] is an Mn content expressed in terms of MnO.

* * * * *